United States Patent [19]

Fowler et al.

[11] Patent Number: 4,608,457
[45] Date of Patent: Aug. 26, 1986

[54] TELECOMMUNICATIONS DEVICE FOR THE HEARING IMPARED

[76] Inventors: Stephen L. Fowler, Box 156, Moore, S.C. 29369; Allison T. Brown, Box 125, Simpsonville, S.C. 29681

[21] Appl. No.: 599,192

[22] Filed: Apr. 11, 1984

[51] Int. Cl.⁴ ............................................. H04M 11/00
[52] U.S. Cl. .............................. 179/2 A; 179/2 DP; 179/84 VF; 179/84 L
[58] Field of Search ............... 179/2 A, 2 DP, 84 VF, 179/84 L, 2 C, 84 C, 2 AM

[56] References Cited

U.S. PATENT DOCUMENTS

| | | | |
|---|---|---|---|
| 3,585,303 | 6/1971 | Chieffo | 179/84 LX |
| 4,012,599 | 3/1977 | Meyer | 179/84 VF |
| 4,046,970 | 9/1977 | Castleman | 179/84 L |
| 4,307,266 | 12/1981 | Messina | 179/84 VF X |
| 4,379,210 | 4/1983 | Sparber | 179/84 L |
| 4,426,555 | 1/1984 | Underkoffler | 179/84 VF X |

FOREIGN PATENT DOCUMENTS 0000066  2/1979  World Int. Prop. O. ..... 179/84 VF

*Primary Examiner*—W. J. Brady
*Attorney, Agent, or Firm*—Bailey & Hardaway

[57] ABSTRACT

This apparatus having means responsive to a dual multifrequency telephone output to provide an electrical signal to an automatic gain control so as to provide preconditioning to a signal for amplification so as to provide an amplified signal to a comparator with visual light source responsive thereto to indicate activity at the other end of the phone line and a tone decoder also receiving the amplified signal to a digital binary code corresponding to the dual tone multifrequency signal received.

1 Claim, 7 Drawing Figures

FIG. 6

FIG. 7

| CODE DESCRIPTION ||||||
|---|---|---|---|---|---|
| ALPHABET || NUMBERS || SYMBOLS ||
| LETTERS | DTMF KEY SEQUENCE CODE | NUMBERS | DTMF KEY SEQUENCE CODE | SYMBOLS | DTMF KEY SEQUENCE CODE |
| A | 2,1 | 0 | 0,# | SPACE | 1,4 |
| B | 2,2 | 1 | 1,# | . | 2,4 |
| C | 2,3 | 2 | 2,# | , | 3,4 |
| D | 3,1 | 3 | 3,# | ? | 4,4 |
| E | 3,2 | 4 | 4,# | : | 5,4 |
| F | 3,3 | 5 | 5,# | $ | 6,4 |
| G | 4,1 | 6 | 6,# | * | 7,4 |
| H | 4,2 | 7 | 7,# | ! | 8,4 |
| I | 4,3 | 8 | 8,# | ; | 9,4 |
| J | 5,1 | 9 | 9,# | DOUBLE SPACE | 0,4 |
| K | 5,2 | WORDS AND EXPRESSIONS || SPECIAL FUNCTIONS ||
| L | 5,3 ||||||
| M | 6,1 | EXPRESSIONS | DTMF KEY SEQUENCE CODE | FUNCTION | DTMF KEY SEQUENCE CODE |
| N | 6,2 |||||
| O | 6,3 |||||
| P | 7,1 | HELLO HOW ARE YOU | 0,0 | *FORWARD/REVERSE MODE | *,* |
| Q | 0,1 | YES | 1,0 | FAST REVERSE | 1 |
| R | 7,2 | NO | 2,0 | FAST FORWARD | 2 |
| S | 7,3 | MAYBE | 3,0 | EXIT FORWARD/REVERSE MODE | 3 |
| T | 8,1 | OK | 4,0 |||
| U | 8,2 | WHAT | 5,0 | *TO REVIEW MESSAGE STORED IN THE DEVICE'S MEMORY. ||
| V | 8,3 | WHEN | 6,0 |||
| W | 9,1 | WHERE | 7,0 |||
| X | 9,2 | WHY | 8,0 |||
| Y | 9,3 | HOW | 9,0 |||
| Z | 0,2 | WHO | #,0 |||
|  |  | BYE | *,0 |||

TELECOMMUNICATIONS DEVICE FOR THE HEARING IMPARED

BACKGROUND OF THE INVENTION

This invention relates generally to the art of a device to assist the hearing impaired and more particularly to an apparatus to assist the hearing impaired with telephone communications.

Various apparatus have existed within the prior art in order to facilitate telephone usage by the hearing impaired. For the most part, such apparatus have been dual in nature such that users of the device must have the device present at both ends of the telephone conversation. The limitations upon the hearing impaired when both parties require the use of an apparatus for conversation greatly limits the population with which the hearing impaired can communicate.

A device is described in U.S. Pat. No. 4,012,599 to Meyer wherein information transmitted on a push button telephone may be converted an alphanumeric display.

Various other prior art devices exist which assist the hearing impaired with telecommunications. While such devices have limited success, various shortcomings exist within the prior art.

SUMMARY OF THE INVENTION

It is thus an object of this invention to provide a novel apparatus to assist the hearing impaired with telecommunications.

It is a further object of this invention to provide such a telecommunication device which not only visually displays information, but which has additional means to indicate communicated activity and corroborate or invalidate displayed information.

It is a further and more particular object of this invention to provide a telecommunication device which requires only the hearing impaired to utilize such a device during telecommunications.

It is a further and more particular object of this invention to provide such an apparatus which has memory capability so as to store telephone messages for replaying and delayed playing of messages.

It is a further and more particular of this invention to provide such an apparatus which may be utilized with and compatible with substantially any telephone which can receive a dual tone multifrequency signal.

It is a still further and yet more particular object of this invention to provide such an apparatus which will also permit personal monitoring of the audio output of a telephone ear piece simultaneously with the use of the apparatus.

These as well as other objects are accomplished by an apparatus having means responsive to a dual tone multifrequency telephone output to provide an electrical signal to an automatic gain control so as to provide preconditioning to a signal for amplification so as to provide an amplified signal to a comparator with visual light source responsive thereto to indicate activity at the other end of the phone line and a tone decoder also receiving the amplified signal for converting the amplified signal into a digital binary code corresponding to the dual tone multifrequency signal received. A microprocessor communicates with random access memory for a receipt seat of the digital binary code in order to direct the action of the random access memory in accordance with preprogrammed instructions for visual display of the received information in accordance with the preprogrammed instructions.

BRIEF DESCRIPTION OF THE DRAWINGS

FIG. 6 of the drawings illustrates a standard telephone "Touch Tone keypad".

FIG. 7 of the drawings is a chart illustrating in tabular form the code and logic in accordance with this invention.

DETAILED DESCRIPTION

In accordance with this invention, it has been found that an apparatus in accordance with that summarized above particularly including a light source removed from the analog circuitry and particularly embodying automated gain control provides significant advantages over prior art devices. A distinct advantage of the apparatus in accordance with this invention, is the ability to process information received from a dual tone multifrequency generator of the type that is normally referred to under the trademark "Touch Tone" while also permitting the user to audibly monitor the output of a telephone hand piece. Various other advantages and features will become apparent from a reading of the following description given with reference to the various figures of drawings.

Figure 1:
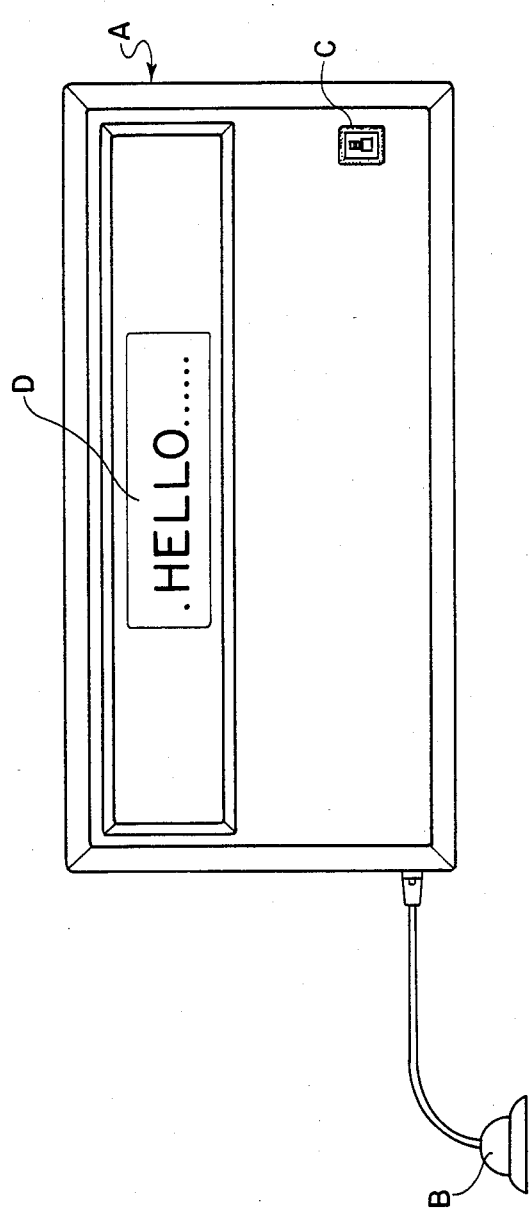
FIG. 1 illustrates the external characteristics of the appratus in accordance with this invention.

FIG. 1 of the drawings illustrates the external features of the apparatus A in accordance with this invention. A suction cup including an audio pick up such as a piezoelectric device or conventional microphone B. The apparatus in the main body portion A thereof has a light source such as a light emitting diode C and a visual display D such as a dot matrix liquid crystal diode display.

In general terms the hearing impaired person may take the apparatus A to any conventional telephone and attach the suction cup with an audio pick up B to an area of the telephone near the ear piece thereof. The hearing impaired person may then initiate a telephone call with the ringing thereof being received by an audio pickup B and which is illustrated by a flashing of light C in sequence with the ringing of the telephone. A busy signal would indicate a similar type sequence upon light C.

Upon answering of the initiated call by a non hearing impaired person, the hearing impaired person may verbally explain that the call initiator is hearing impaired but that the receiver of the call may communicate through a dual tone multifrequency generator in accordance with predetermined instructions. For example, the hearing impaired person may indicate that a meeting is desired at two o'clock and request that the receiver respond affirmatively by contacting key number "1". In which event, the word "YES" would appear on screen D. Alternatively, a negative response could be indicated by depressing key number "2" which would cause the word "NO" to appear upon screen D.

The hearing impaired individual may also monitor the output of the earpiece of the telephone such that only partially impaired individuals may also hear what is being transmitted while receiving assurance from the screen as to the validity of the message heard.

With the above as a general explanation of the operation of the apparatus in accordance with this invention, a more particular description will now be given with reference to the preferred components of the apparatus and its preferred operation.

Figure 2:
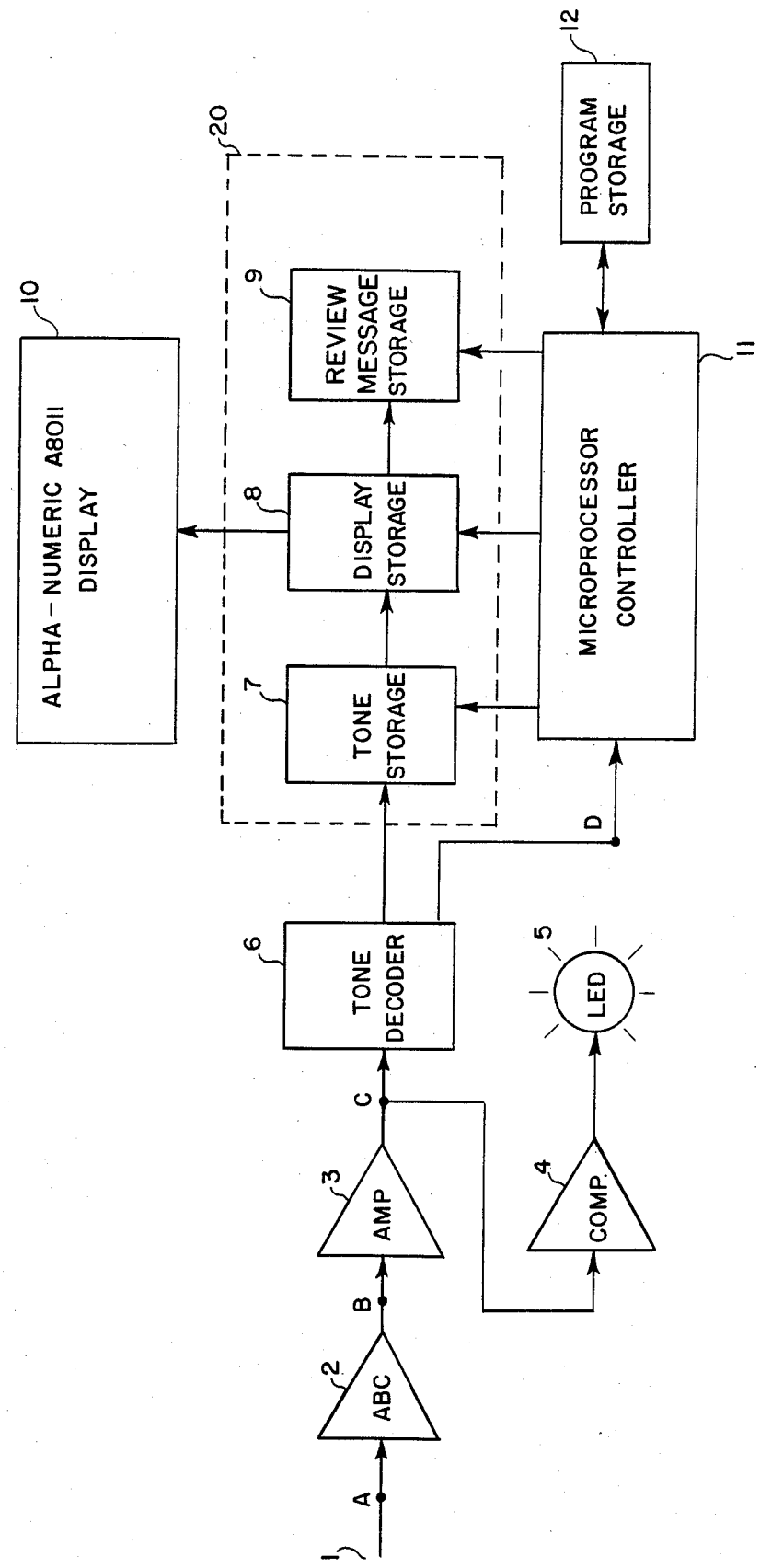
FIG. 2 of the drawings is a schematic diagram of the circuit of the appratus in accordance with this invention.

Referring to FIG. 2 of the drawings, 1 represents means responsive to a dual tone multifrequency output of a telephone receiver in order to convert such to an electrical signal indicative of the output. This corresponds to the means within suction cup B of FIG. 1. This may normally be a transducer in an inductive suction cup device but may be a microphone or a direct connection to the telephone circuitry. The responsive means converts the dual tone signal into an electrical signal at point A.

An automated gain control circuit 2 is a significant advantageous feature of this invention. Automatic gain control circuit 2 preconditions the electrical signal at A to an acceptable amplitude for the remainder of the circuitry. This is of significant advantage due to the varying output of telecommunications devices. This feature makes the apparatus of this invention compatible with virtually all telecommunication equipment and with the various dual tone multifrequency generators which may be utilized. Thus if the transducer 1 receives a low amplitude signal, the automatic gain control provides a large gain. On the other hand, if the signal received is relatively high amplitude, then the automatic gain control provides less gain.

The preconditioned signal at B is then amplified by amplifier 3 with the amplified signal directed to a comporator 4 and tone decoder 6. The comporator 4 provides a high output voltage level for any tone or voice signal received by the telephone. This voltage level is then directed to a light source 5 preferrably a light emitting diode correponsing to "C" in FIG. 1. The diode lights each time the comporator goes high as a result of receiving a signal from the telephone circuit through transducer 1, automated gain control 2 and amplifier 3. The light gives a visual indication of the line status and activity, eg. ringing, busy signal, voice, etc.

Tone decoder 6 is an integrated circuit which converts the electrical amplified audio frequency tones into a digital binary code which represents the specific combination of two tone frequencies that were contained in the dual tone multifrequency tone received by the responsive means 1. The decoder fiters out all other components of the electrical signal such as noise and voice. The decoder further fuctions to check that the tone signals are of sufficient duration and that there is sufficient pause time between signals.

The tone decoder 6 communicates with a microprocessor 11 and remote access memory 20. Remote access 20 memory comprises a tone storage 7, display storage 8 and review message, storage 9. Remote access memory 20 is preferrably of a single chip structure.

Memory storage 7 is for the retention of tone in that it stores or saves the binary code representing the dual tone multifrequency tone pair prior to its interpretational processing by microprocessor 11. This allows for high speed transmission and receiving of communication information. For example, in the event that the controller is unavailable due to processing other information incoming new data is stored rather than lost.

Memory display storage 8 stores data ready to be sent to screen 10, this data is derived from tone storage 7 by processing through microprocessor 11 in accordance with preprogrammed instructions pursuant to program storage 12. The preferred program is described below.

When the displayed storage 8 is filled with data and screen 10 is also filled and new data is received for displaying, the previous data is transferred from the display storage 8 into message storage 9. This data is not directly viewable on display 10. However, in accordance with the programming, this information may be viewed at any time by transmitting an appropriate message to the microprocessor 11. Display device 10 displays alphabetic, numeric, punctuation and other characters. The preferred screen a $1 \times 16$ or $2 \times 16$ dot matrix liquid crystal display. However, the display may be of any conventional type.

Microprocessor 11 controls the operation of random access memory 20 and screen 10 in accordance with predetermined instructions to be described below.

Figures 1, 3:
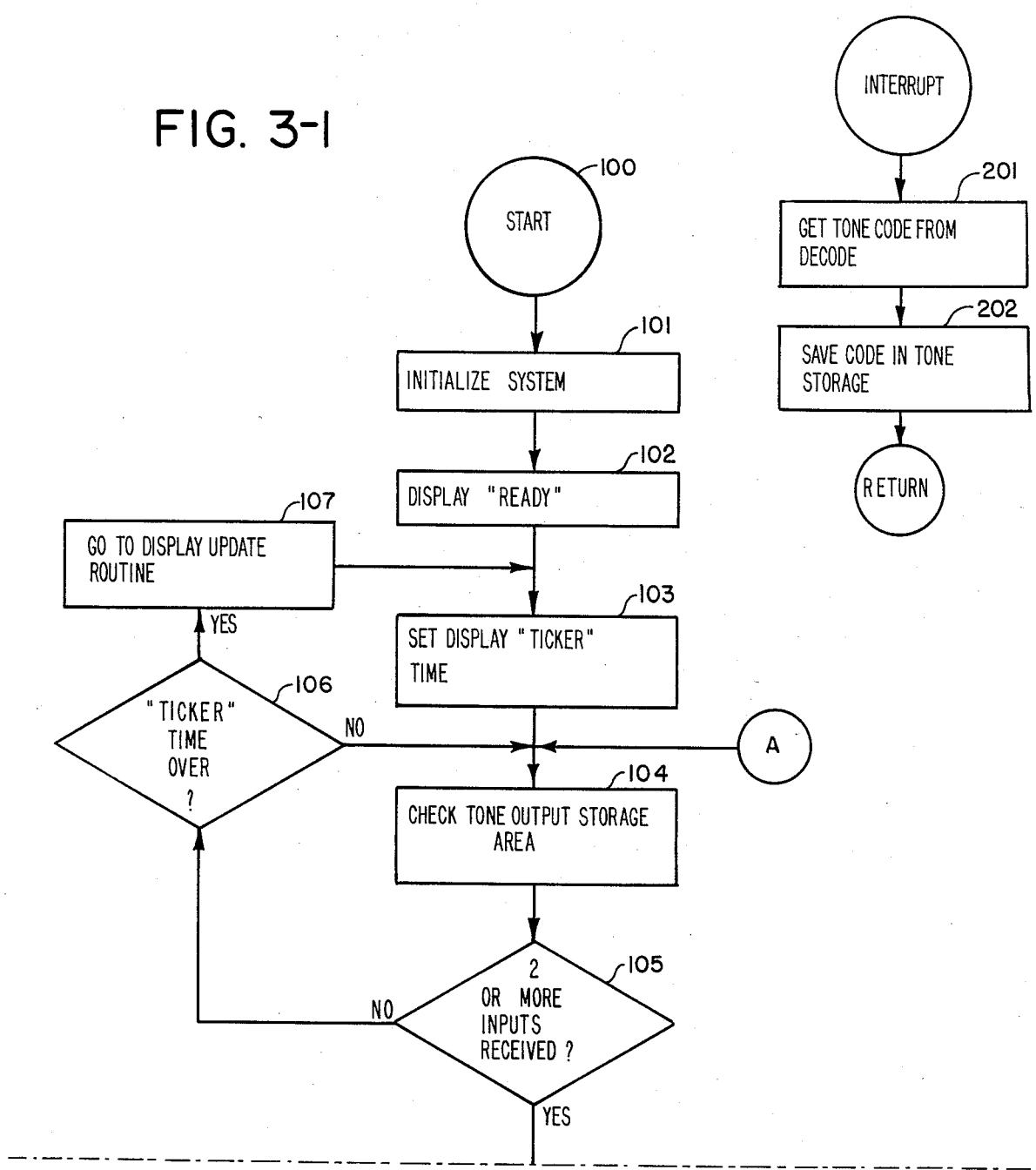
FIGS. 3, 4, and 5 schematically illustrate the logic of the microprocessor in accordance with this invention.
Figures 2, 3:
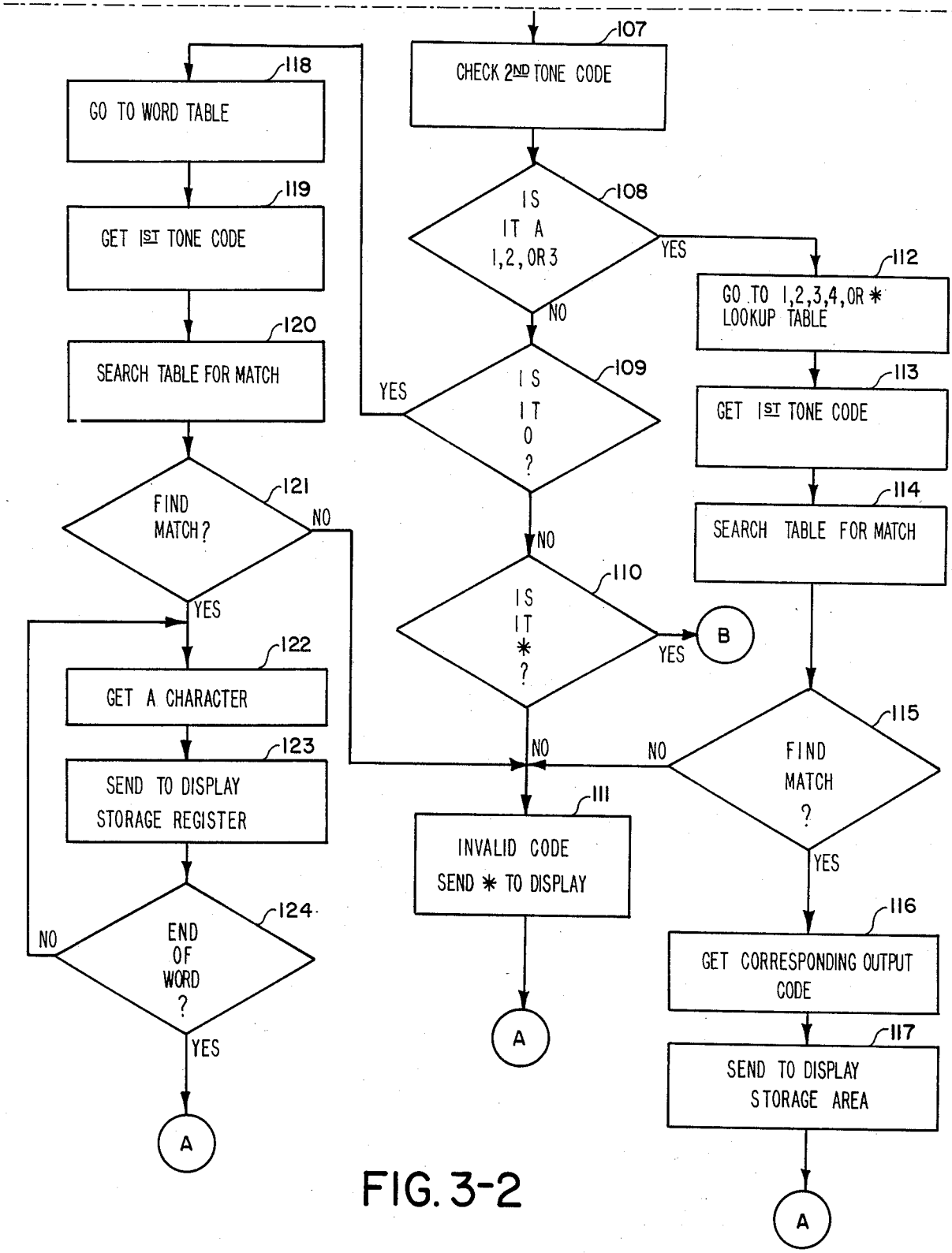
Figure 4:
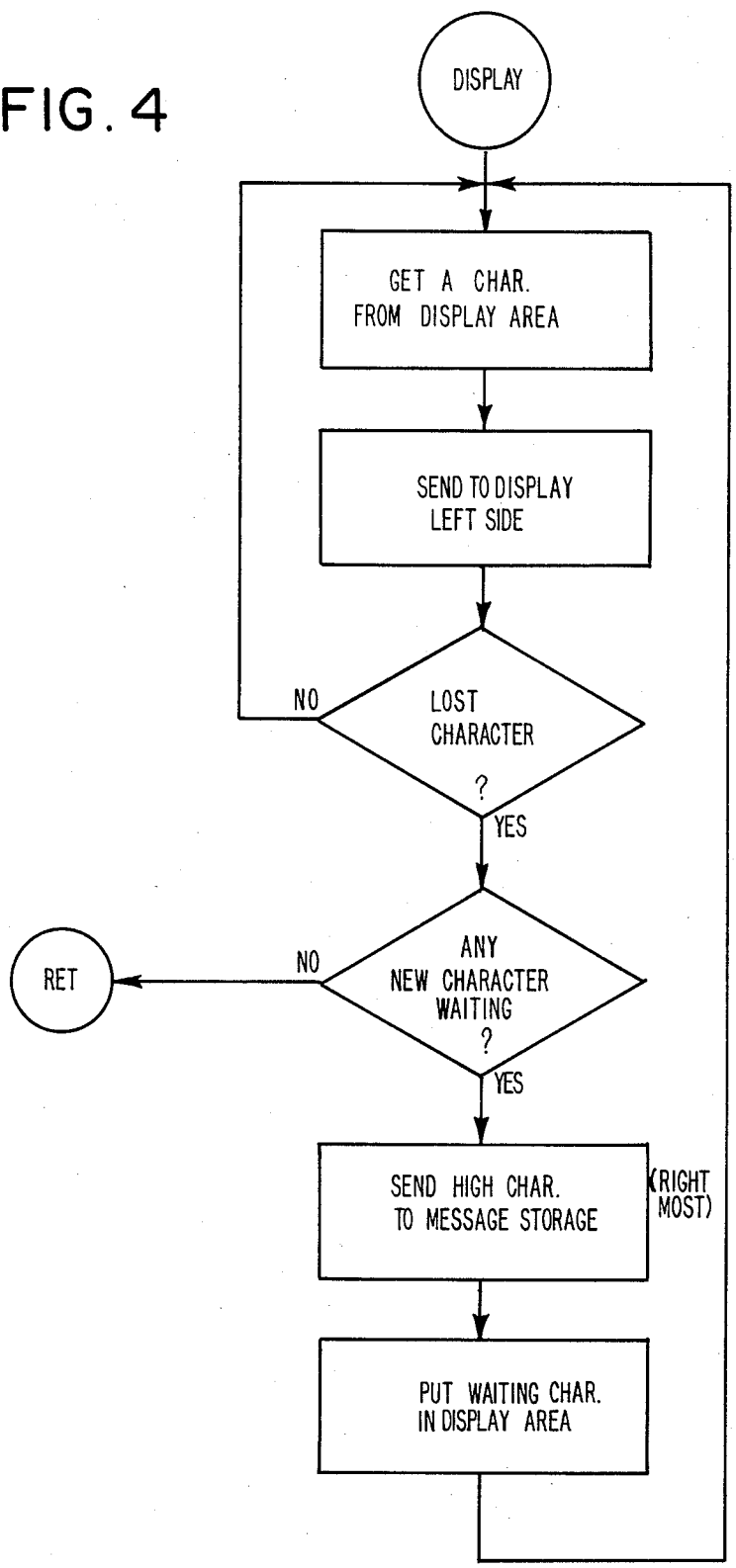
Figure 5:
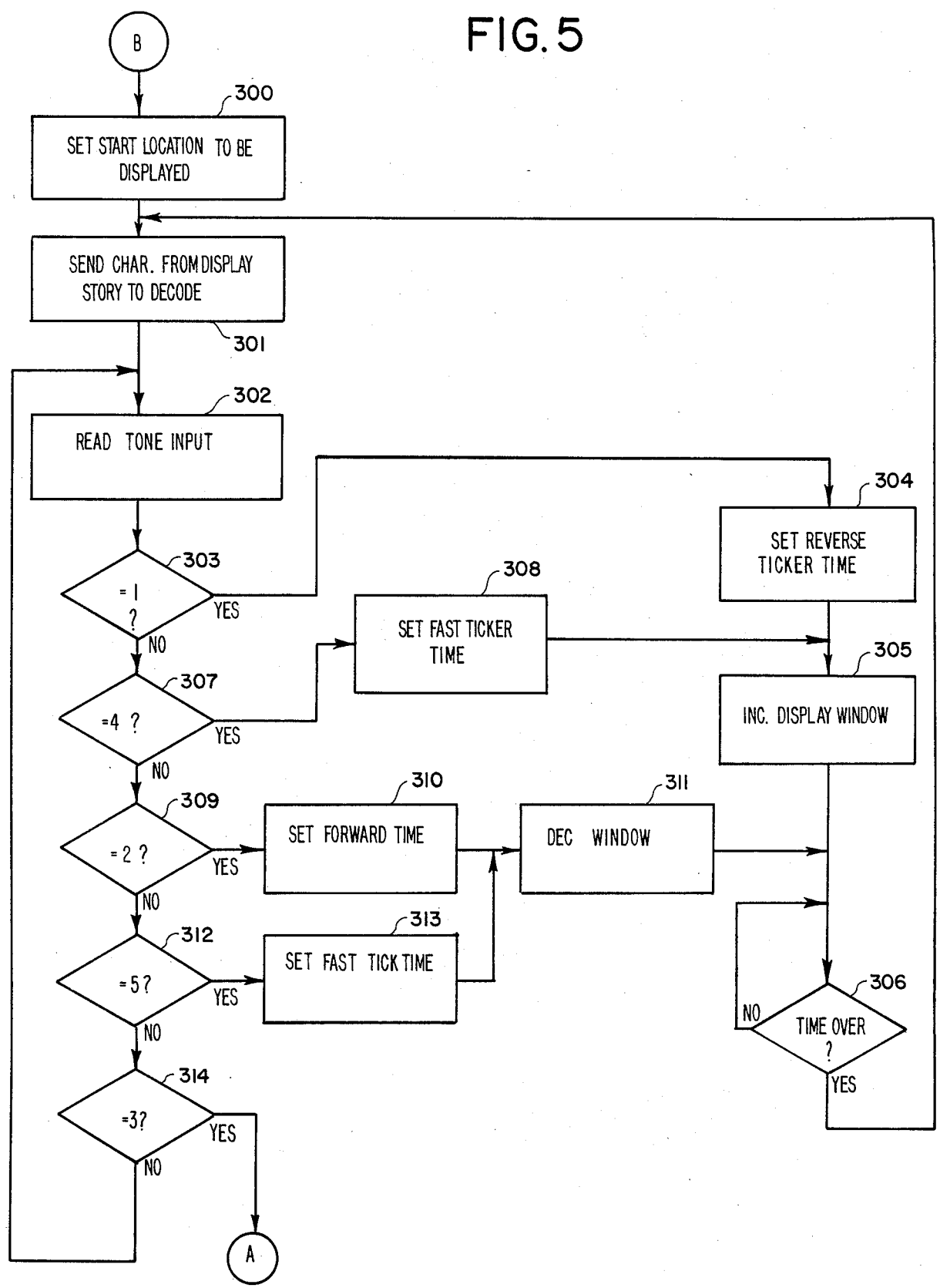

FIGS. 3, 4, and 5 describe the sequence of events programmed into the microprocessor which are outlined below.

Upon powering the apparatus, the stored program causes operation to begin at step 100.

The first sequence of events is to initialize various flags, registers, and storage devices. It is important to note, however, that the message storage area 9 is not cleared. This means that previously stored messages always remain in internal storage except under the conditions that the (a) batteries are removed, or (b) batteries are discharged below a minimum level.

Next, the system will get a preprogrammed sign or message "Ready," from the program memory device 12 and place this message in the display storage device 8 and will subsequently be sent to the display device 10. Displaying the "Ready" message gives a good indication that the device is operational each time the device is turned on.

When a valid dual Tone Multifrequency (DTMF) tone is detected by the tone decoder 6 a signal D is produced to tell the microprocessor controller 11 to get the tone code and put it in the tone storage device 7. When the microprocessor controller receives this signal D it produces an interrupt which forces the control program to steps 201 and 202 which reads the binary tone code from the tone decoder and saves it immediately in tone storage 7. This sequence of events will occur no matter which step of the program the apparatus is functioning. This is referred to as an interrupt driven.

Step 103 sets up a time delay ("ticker" time) which establishes the rate at which characters to be displayed will be scrolled across the display device 10 from right to left.

Next the tone storage device is checked (step 104) to see if there is any tone input data to be processed for displaying. Since two tone codes are necessary for further processing and code conversion, this decision as to whether or not two codes have been received is made in step 105.

If there are less than two codes in the storage device and therefore not time for code conversion, then the "ticker" time is checked at step 106 to determine if it is enough time to update the display device.

If there is not time to update the display, the process goes back to step 104 and remains in the loop 104-10-5-106 until either (a) two or more inputs occur in the tone storage device or (b) the time runs out.

In the case of the time being over the sequence goes to step 107 which is the routine to update the characters to be displayed on the display device. After completion of the display, update routine (step 107) the sequence returns to step 103 and the above steps repeat continuously in the loops as described above until the condition of two or more tone inputs occur.

If two or more tone inputs have occured, the program flow continues out of the above loops and proceeds to step 107 which begins the code interpretation and conversion process.

As explained earlier, the code necessary to generate an alphabetic character, number, symbol, or function requires a sequence of two tones. The 1st tone preselects a specific character in one of several character groups. The second tone entered specifies the group. For example the "1" group consists of the alpha characters which appear in the left most position on each key of the DTMF generator. The "2" group contains the middle alpha characters. The "3" group contains the right most alpha characters. The "4" group contains punctuation symbols. The "#" group contains the numbers 0-9. The "0" group contains special words which are commonly used in conversation. The "*" group is used to activate operational features such as the message review feature.

The first step of code interpretation (107) checks the second tone code of the two sequence entry to determine which of the above character groups was selected and thus which area of the stored program is to be searched for the specific character desired.

If the 2nd tone code is a 1, 2, 3, 4, or #, at step 108 the program branches to step 112 where the specific character group is determined. These five groups all represent single character groups i.e. a single alpha, numeric, word, or punctuation.

Once the group has been determined, the 1st tone code is retrieved by step 113 from the tone storage device. The selected group of characters in the program memory is then searched for a match in step 114 to be 1st tone code. If a match cannot be found in step 115, this would indicate an invalid entry has been made and the next step branches to step 111 where error symbol "*" would be sent to the display device so that the person receiving the message would be aware of the error.

If a match is found in step 114 then step 115 would branch into step 116 which retrives the selected output code to be displayed from the group table. In the currently preferred embodiment of this device these output codes are of the standard ASCII format.

Once the selected output code is found in step 116 it is then transferred in step 117 to the display storage device where it waits to be sent to the display device at the proper time.

This would complete the process loop necessary to receive, decode and transfer one single character code such as an "A" or a "1" to the display. Flow of the program then returns to step 104 and starts over again.

If in step 108, the second tone code had not been 1, 2, 3, 4, or #, it would then be checked to see if there is a "0" in step 109. If there is a "0" this would indicate a special word had been selected and thus process flow would go to step 118 which selects the "word" described except instead of finding a single character and sending it to the display storage device these steps find a multiplicity of characters (a word or words) and send a character at a time to the display storage device. These characters wait in display storage device until sent to the display device. After the last character of the word is sent (step 124) this completes the loop for sending a complete word to be displayed and the process flow returns to step 104 where the cycle is ready to start again.

In step 109 if the 2nd tone code had not been a "0", flow would then proceed to step 110 where it would be checked to be an "*". If this check is found to be true, which would indicate a special control function is desired, flow would then proceed to step 300 which is the message review feature operation.

If in step 110 it is found not to be an "*", this would mean the 2nd tone code was not a 1, 2, 3, 4, #, 0, or * indicating a code not recognized by this device and is thus an erroneous input. Flow then proceeds to step 111 which sends an "*" character to the display device to warn the person receiving the message that the sender of the message had made an erroneous input.

Program flow would then return to step 104 to being the loop again and be ready to process further inputs.

The message review feature, selected in step 110 by the entry of an "*", allows the user of the device to review messages received by and stored in this device. This is accomplished by allowing the user to scroll previously received messages across the display device in either the forward (left to right) or reverse (right to left) direction. This scrolling can be done at slow or fast speeds. Advantageously, control of these functions is from the DTMF generator by the use of specific tones. This means no additional buttons are required on the device itself.

Step 300 initializes various parameters in the device to set up the review mode. The most recently received characters in the display storage device are then sent (step 301) to the display device.

Next, the tone decoder device is read in step 302 to see if a tone code is being produced (by holding down one of the appropriate buttons on the DTMF generator.)

If the tone code is determined to be a "1" this causes the apparatus to go into the reverse scrolling mode and the program flow would proceed to step 304 which sets up the proper scrolling time. Step 305 would then shift the display window such that the 1st character in the message review device would be added to the right side of the display device shifting the currently displayed characters to the left by one position. To maintain the proper scrolling rate, the process waits in a loop (step 306) until the appropriate time has elapsed. At this time the program flow returns to step 301 where the new and the new shifted set of characters will be sent to the display device. The apparatus will remain in this loop as long as the "1" button (tone generated) is held depressed. When released, scrolling will stop but the device will remain in the review mode with no button depressed. If the "1" button is again depressed, scrolling will resume until the button is released.

Loop 307-308-305-306-301 which is activated by generating a tone code "4" (by depressing the "4" button) is the same as described above except the scrolling time ("ticker" time) is set for a faster speed.

Loop 307-310-311-306-301 is also similar to the above loops except the display window is moved in the opposite direction (step 311) to enact forward scrolling. This mode is selected by depressing the "2" button (step 309).

Loop 312-313-311-306-301 is the same loop for forward scrolling except at a faster rate. (step 313)

To exit the message review mode, the "3" button is depressed. This causes the program flow to go to step 314 which causes the program to return to step 104. This returns the display characters to the last set entered. The device is now back to its normal operation for receiving, decoding, and displaying characters sent to this device from the transmitting DTMF generator.

PREFERRED METHOD OF USE

Having generally described the apparatus of this invention and the preferred construction thereof as well as the programming thereof specific information is provied below with regard to the use of the apparatus by a hearing impaired individual. The apparatus of this invention is preferably utilized with a code operable utilizing a dual tone multifrequency generator keypad.

A complete DTMF generator has 16 keys. The standard telephone keypad only has 12 keys. When any key of a DTMF generator is depressed two tones are generated: one high tone corresponding to the column of the key and one low tone corresponding to the row of the key. These two frequencies are simultaneously sent out over a common medium of transmission whether it is telephone wires, audio sounds, etc.

For example if the number 1 key is depressed both a 697 Hz and a 1209 Hz frequency signal are generated. Conversely depression of the # key causes a 941 Hz and a 1477 Hz combination frequency signal to be generated.

The communication apparatus decodes and interprets these signal. Through the microprocessor permits a simple coding scheme to allow total communication using only two keystrokes of the DTMF generator. The apparatus not only allows total alphanumeric communication. It allows transmission of punctuations and symbols. It also allows simple transmission of the words and expressions most commonly used in everyday conversation.

The apparatus stores all messages received so that the user may review the conversation either immediately or at some later time. The stored message also may be printed out at anytime on a standard printer.

A standard telephone style DTMF keypad is shown in FIG. 6.

The alphabet (except Q and Z) as well as the numbers appear on the standard keypad. Keys 2 through 9 each represent three alphabetic characters. Therefore to transmit any alphabetic character the code becomes
1. Depress the key on which the desired charcter exists then
2. Depress the key "1", "2", or "3" corresponding to the position of the character on its key.

Example: An "A" is transmitted by first depressing the "2" key then the "1" key representing the 1st character position on the "2" key. A "K" is transmitted by depressing "5" then the "2" keys representing the second character on the "5" key. A "Y" is transmitted by depressing the "9" then "3" keys representing the third character on the "9" key.

The "Q" and "Z" are assigned as the 1st and 2nd letters respectively on the "0" key.

The general rule for alphabet transmission is "press the letter's key the press the letter's position key ("1", "2", or "3").

Numbers are generated as follows. The "#" key which is commonly referred to as the "pound" or "number" sign is used to transmit numbers. To utilize this code:
1. First depress the key on which the desired number exists then
2. Depress the "#"

Example: A "1" is transmitted by first depressing "1" then "#". An "8" is transmitted by first depressing "8" then "#".

The apparatus designates the "4" key as the punctuation and symbols mode key. The following commonly used punctuations and symbols are assigned to the indicated keys:

| Symbols | Assigned Key | DTMF Code |
|---|---|---|
| Space | 1 | 1 4 |
| . | 2 | 2 4 |
| , | 3 | 3 4 |
| ? | 4 | 4 4 |
| : | 5 | 5 4 |
| $ | 6 | 6 4 |
| # | 7 | 7 4 |
| ! | 8 | 8 4 |
| ; | 9 | 9 4 |
| Double Space | 0 | 0 4 |

To transmit a punctuation or symbol first the assigned key is depressed then the mode key ("4").

Example: a space is achieved by depressing "1" then "4".

a "$" is transmitted by depressing "6" then "4".

The "0" key is assigned as the word or expressions key. Several of the words most commonly used in conversation are assigned to the 1 thorough # keys. These words are shown below.

| Words or Expressions | Assigned Key | DTMF Code |
|---|---|---|
| Hello, how are you | 0 | 0 0 |
| Yes | 1 | 1 0 |
| No | 2 | 2 0 |
| Maybe | 3 | 3 0 |
| Okay | 4 | 4 0 |
| What | 5 | 5 0 |
| When | 6 | 6 0 |
| Where | 7 | 7 0 |
| Why | 8 | 8 0 |
| How | 9 | 9 0 |
| Who | # | # 0 |
| Bye | * | * 0 |

To transmit a word or expression first depress the assigned key then "0" key.

Example: "Hello How are You" is transmitted by "0" then "0".

The apparatus stores the messages received and allows these to be reviewed by activation of a simple code.

The "*" key is designated as the Forward and Reverse review mode key. This key must be depressed twice (*,*) to place the apparatus in the review mode. Once the apparatus is placed in the review mode, the "1", "2", and "3" keys are used to control the review.

Reverse: The "1" key reverses the messages in memory across the display. The message rapidly traverse the display as long as the "1" key is held depressed. ("4" is fast reverse)

Forward: The "2" key slowly scrolls the stored messages across the display for review. The messagees continue to scroll across the display as long as the "2" key is held depressed. ("5" is fast forward).

Exit Review Mode:

The "3" key causes the apparatus to exit the review mode. The apparatus's display and memory return to to the point prior to entering the mode.

The table of FIG. 7 describes the basic code used in the apparatus.

The apparatus is equipped with LED 5 (light emitting diode) which gives a visual indication of the phone status. This light also allows the user to find the best position on the telephone or apparatus transducer. This transducere is placed on the phone where it may pick up the best signal. Several styles of the telephones exist. The apparatus incorporates an automatic gain circuit (AGC) to insure proper signal levels from the many types of telephone instruments in use.

When using the apparatus, first turn the device on and with a few seconds for it to initialize its circuits. This is indicated by the light going out and the display indicating "Ready". Next pick up the telephone receiver and place the pick-up transducer on the telephone in a position which best detects the dial tone. This is indicated by the light being its brightest and burning steady. The apparatus is now ready to receive signals.

Dial the telephone number. If the user is the calling party, he should now dial the telephone number he desires. The status lights will indicate the telephone line conditions. After the telephone number has been dialed, the light will either indicate a rining signal or busy signal.

The ringing singal of the telephone system in the United States is normally a one or two second signal for ringing followed by a four second period of silence. This shows up on the light as it burning for one or two seconds, out for the four seconds, on the one to two, out for four etc.

The busy signal of the telephone system in the United States is normally one half second signal followed by one half second of silence. This shows on the light as being on for one-half second and off for one-half second. This is a blinking light with one-half second intervals.

Talking or voice is shown by the light as erratic on/-off flashes.

When a user dials a telephone number, the sequence of the indicator light normally is 1. Dial tone—steady light
2. Dialing—flashes of the light
3. Ringing—1 second one, 4 seconds off
4. Either:
   A. Busy—one-half second off or
   B. Person answering—erratic flashes of the light If the user is dialing from a touch tone telephone, his dialing tones will be decoded. Since the apparatus uses a two sequence code the dialing of a seven digit telehone number may leave the apparatus out of sequence and not ready to decode the communication from the calling party. This can be checked and rectified by pressing any key other than the * key. Then the 1-4 key sequence is used to space the non message characters over and insure the apparatus is ready for communication.

While communicating with the apparatus, valid codes are displayed on the screen. If the apparatus decodes an invalid character, it will display double * instead of a character. This means the person using the DTMF tone has requested an invalid sequence of keys or has forgotten to press two keys for a character and now has the apparatus out of sequence. This condition is cleared by pressing any one key except the "*" key. This may be accomplished at either the sender or the receiver end.

The apparatus requires only the hearing impaired person to use the communication device. If both parties of a conversation are hearing impaired, then of course, they both must have the apparatus. The apparatus may be used with a standard telephone answering machine. Any tones recorded on the audio tape of a standard answering machine may be played back, received and decoded by the apparatus at any time desired. The apparatus' memory capability (1 to 8 thousand characters of memory) makes it a message storage device even without external recording devices. The apparatus can be used with standard keybord TDD devices because of its internal use of the industry standard ASCII digital code. The apparatus can be used on all styles of telephones including the new cordless and abstract styling models.

As many variations will become apparent to those of skill in the art from a reading of the above description which is exemplary in nature such variations are embodied within the spirit and the scope of the following appended claims.

It is claimed that:

1. A telephone assistance apparatus for the hearing impaired, comprising:

means responsive to a dual tone multifrequency output of a telephone receiver to produce an electrical signal indicative of said output;

automatic gain control circuitry to receive said signal to assure that the amplitude thereof is within a predetermined range;

a first amplifier communicating with said automatic gain control circuitry;

a comparator communicating with and receiving the amplified signal from said first amplifier to provide a high output voltage in response to said signal;

a visually perceivable light source communicating with said cpmparator and activated thereby in response to the amplified signal therefrom;

a tone decoder also communicating with said amplifier for receiving the amplified signal therefrom and converting said amplifier signal into a digital binary code corresponding to said dual tone multifrequency output;

random access memory for receiving and storing the digital binary code from said tone decoder;

a microprocessor communicating with said random access memory and said tone decoder to direct the action of said random access memory in accordance with preprogrammed instruction; and a visual display screen for displaying alphabetic, numeric, and punctuation data from said random access memory in response to instructions from said microprocessor.

* * * * *